US010815881B2

(12) United States Patent
Clements et al.

(10) Patent No.: US 10,815,881 B2
(45) Date of Patent: Oct. 27, 2020

(54) COUNTER ROTATING TURBINE WITH REVERSING SPEED REDUCTION ASSEMBLY

(71) Applicant: General Electric Company, Schenectady, NY (US)

(72) Inventors: Jeffrey Donald Clements, Mason, OH (US); Darek Tomasz Zatorski, Fort Wright, KY (US); Alan Roy Stuart, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 15/709,651

(22) Filed: Sep. 20, 2017

(65) Prior Publication Data
US 2019/0085766 A1    Mar. 21, 2019

(51) Int. Cl.
*F02C 3/067*    (2006.01)
*F02K 3/072*    (2006.01)
(Continued)

(52) U.S. Cl.
CPC .............. *F02C 3/067* (2013.01); *F01D 1/26* (2013.01); *F01D 5/03* (2013.01); *F01D 5/142* (2013.01);
(Continued)

(58) Field of Classification Search
CPC .... F01D 1/24; F01D 1/26; F02C 3/107; F02C 7/36; F04D 19/024; F05D 2250/44; F05D 2260/40
See application file for complete search history.

(56) References Cited

U.S. PATENT DOCUMENTS 4,909,031 A   3/1990 Grieb
4,947,642 A   8/1990 Grieb et al.
(Continued)

FOREIGN PATENT DOCUMENTS

EP    2085586    8/2009
EP    3112613    1/2017
(Continued)

OTHER PUBLICATIONS

Hill, P., Peterson, C., Mechanics and Thermodynamics of Propulsion, 1992, Addison-Wesley Publishing Company, 2nd Edition, p. 378 (Year: 1192).*
(Continued)

*Primary Examiner* — Richard A Edgar
*Assistant Examiner* — Maranatha Boardman
(74) *Attorney, Agent, or Firm* — Dority & Manning, P.A.

(57) ABSTRACT

The present disclosure is directed to a gas turbine engine including a turbine section including a first rotating component interdigitated along a longitudinal direction with a second rotating component. The first rotating component and the second rotating component are each coupled to a speed reduction assembly in counter-rotating arrangement. The first rotating component comprising an outer shroud and a plurality of outer shroud airfoils extended inward along a radial direction from the outer shroud. A connecting member couples the outer shroud to a radially extended first rotor. The second rotating component comprising an inner shroud and a plurality of inner shroud airfoils extended outward along the radial direction from the inner shroud, the plurality of inner shroud airfoils in alternating arrangement along the longitudinal direction with the plurality of outer shroud airfoils. The gas turbine engine defines a radius per unit thrust defined by a maximum radius at the turbine section
(Continued)

over a maximum thrust output between approximately 0.0004 to approximately 0.0010 inches per pound thrust.

20 Claims, 4 Drawing Sheets

(51) Int. Cl.
  *F01D 5/14* (2006.01)
  *F01D 5/03* (2006.01)
  *F01D 1/26* (2006.01)
  *F02K 3/068* (2006.01)
  *F02C 3/107* (2006.01)
  *F02C 7/36* (2006.01)

(52) U.S. Cl.
  CPC ............... *F02C 3/107* (2013.01); *F02C 7/36* (2013.01); *F02K 3/068* (2013.01); *F02K 3/072* (2013.01); *F05D 2250/44* (2013.01); *F05D 2250/80* (2013.01); *F05D 2260/40311* (2013.01); *F05D 2270/051* (2013.01)

(56) References Cited

U.S. PATENT DOCUMENTS

| | | | |
|---|---|---|---|
| 4,969,325 A * | 11/1990 | Adamson | F02C 3/067 416/129 |
| 7,451,592 B2 | 11/2008 | Taylor et al. | |
| 7,685,808 B2 | 3/2010 | Orlando et al. | |
| 7,882,693 B2 | 2/2011 | Schilling | |
| 8,747,055 B2 | 6/2014 | McCune et al. | |
| 9,022,725 B2 | 5/2015 | Merry et al. | |
| 9,028,200 B2 | 5/2015 | Suciu et al. | |
| 9,080,512 B2 | 7/2015 | Suciu et al. | |
| 9,631,558 B2 | 4/2017 | McCune et al. | |
| 10,030,586 B2 | 7/2018 | Kupratis et al. | |
| 2009/0191045 A1 | 7/2009 | Suciu et al. | |
| 2010/0154384 A1 | 6/2010 | Schilling | |
| 2013/0219856 A1 | 8/2013 | Suciu et al. | |

FOREIGN PATENT DOCUMENTS

| | | |
|---|---|---|
| GB | 594206 | 11/1947 |
| JP | 2005/264940 A | 9/2005 |
| JP | 2010/144724 A | 7/2010 |
| JP | 2013/181540 A | 9/2013 |
| JP | 2014/234822 A | 12/2014 |
| JP | 2017/015090 A | 1/2017 |

OTHER PUBLICATIONS

European Search Report Corresponding to Application No. 18193679.0 dated Feb. 18, 2019.

Machine Translated Japanese Search Report Corresponding to Application No. 2018167436 dated Nov. 22, 2019.

* cited by examiner

COUNTER ROTATING TURBINE WITH REVERSING SPEED REDUCTION ASSEMBLY

FIELD

The present subject matter relates generally to gas turbine engine architecture. More particularly, the present subject matter relates to speed reduction assembly and turbine section arrangement for gas turbine engines.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Conventional gas turbine engines generally include turbine sections defining a high pressure turbine in serial flow arrangement with an intermediate pressure turbine and/or low pressure turbine. Additionally, conventional gas turbine engine turbine sections generally include successive rows or stages of stationary and rotating airfoils (e.g. vanes and blades). Stationary airfoils or vanes are often employed to direct or otherwise condition a flow of combustion gases before passing across rotating airfoils or blades. Stationary airfoils often require cooling air routed from other areas of the gas turbine engine, such as the compressor section, to mitigate damage from combustion gases. However, routing air from the compressor section to the turbine section, thereby bypassing the combustion section, generally removes energy for combustion and therefore reduces gas turbine engine efficiency.

Furthermore, conventional low pressure turbines often require a plurality of stages to distribute energy or work to operate the fan assembly and/or compressor to which the low pressure turbine is driving. However, the plurality of stages contribute to axial and radial dimensions of the gas turbine engine, which thereby contributes to weight of the overall engine and aircraft to which it is attached, and consequently adversely impacts fuel efficiency, engine performance, and engine and aircraft efficiency.

Known solutions include adding a reduction gearbox between a fan assembly and an engine core, which may reduce the quantity of the plurality of stages of a turbine section necessary to operate the fan assembly and compressor to which it is attached, and may generally provide some net increase in engine efficiency and improvement in fuel consumption. However, adding a reduction gearbox introduces new complexities and limitations to turbine engine design and operation. For example, known reduction gearboxes have an approximately 100% amount of torque or power routed in series from a low pressure turbine through the speed reduction assembly to drive a fan assembly. In such known arrangements, routing an approximately entire amount of torque or power from the low pressure turbine through the gearbox to the fan assembly necessitates complex gearbox designs, increased gearbox weight for the stresses and loads from the substantially entire load from the turbine section, and generally larger diameters of gearbox, thereby retaining or increasing radial dimensions of the engine.

Still further, known solutions including reduction gearboxes in which approximately 100% of torque or power from the low pressure turbine is directed through the gearbox to the fan assembly renders a systemic failure of the gearbox as a single point of failure. In such an arrangement, loss of gearbox operation results in loss of substantially all power from the low pressure turbine being delivered to the fan assembly, thereby reducing engine thrust or power output to an amount produced solely by the engine core through the core flowpath (e.g. approximately 10% of total thrust).

Therefore, there exists a need for an engine that may incorporate a reduction gearbox while reducing or eliminating adverse effects of gearbox placement and indirect drive gas turbine engine assemblies, such as increased turbine engine packaging, such as increased diameter, axial length, or both, and/or single-point system failure of low pressure turbine power to the fan assembly, including bowed rotor startups, increased shutdown-to-startup times, and increased cooling periods.

BRIEF DESCRIPTION

Aspects and advantages of the invention will be set forth in part in the following description, or may be obvious from the description, or may be learned through practice of the invention.

The present disclosure is directed to a gas turbine engine including a turbine section including a first rotating component interdigitated along a longitudinal direction with a second rotating component. The first rotating component and the second rotating component are each coupled to a speed reduction assembly in counter-rotating arrangement. The first rotating component comprising an outer shroud and a plurality of outer shroud airfoils extended inward along a radial direction from the outer shroud. A connecting member couples the outer shroud to a radially extended first rotor. The second rotating component comprising an inner shroud and a plurality of inner shroud airfoils extended outward along the radial direction from the inner shroud, the plurality of inner shroud airfoils in alternating arrangement along the longitudinal direction with the plurality of outer shroud airfoils. The gas turbine engine defines a radius per unit thrust defined by a maximum radius at the turbine section over a maximum thrust output between approximately 0.0004 to approximately 0.0010 inches per pound thrust.

In one embodiment, the engine defines a maximum radius at the turbine section from an axial centerline to an outer diameter of the outer shroud of the first rotating component, the maximum radius defined between approximately 15 inches and approximately 20 inches.

In another embodiment, the engine defines a maximum radius at the turbine section from an axial centerline to an outer diameter of the inner shroud airfoils of the second rotating component, the maximum radius defined between approximately 15 inches and approximately 20 inches.

In yet another embodiment, the engine defines a maximum thrust output between approximately 21000 and approximately 32000 pounds of thrust.

In various embodiments, the engine defines a maximum length approximately between 91 inches and approximately 113 inches. In one embodiment the engine defines a ratio of the maximum length to the maximum radius of between approximately 7.53 and approximately 4.55. In another embodiment, the maximum length is defined from an annular inlet of the fan section to an exit of the last rotor stage of the turbine section.

In still various embodiments, the engine defines between approximately 261 and approximately 392 quantity of rotating airfoils. In one embodiment, the engine defines a ratio of rotating airfoils of the first rotating component and the second rotating component together versus a maximum thrust output, in which the ratio ranges between approximately 0.0081 to approximately 0.0187 airfoils per pound thrust. In another embodiment, the turbine section defines between approximately 3 and approximately 10 stages of rotating airfoils at the first rotating component and the second rotating component together. In one embodiment, the turbine section defines a ratio of rotating airfoils per each stage of the first rotating component and the second rotating component together versus the maximum thrust output, and the ratio ranges between approximately 0.0011 and approximately 0.0031 airfoils per pound thrust.

In yet another embodiment, the engine defines a ratio of the maximum length to a quantity of rotating airfoils of the first rotating component and the second rotating component together, the ratio ranges between approximately 0.232 to approximately 0.435 inches per airfoils.

In various embodiments, the engine further includes a driveshaft coupled to a fan assembly and the turbine section. The driveshaft is coupled to the speed reduction assembly and the first rotating component. The first rotating component and the driveshaft are rotatable at a first speed in a first direction. The second rotating component is coupled to an input component of the speed reduction assembly. The second rotating component is rotatable in a second direction opposite of the first direction at a second speed greater than the first speed.

In one embodiment, the engine defines a direct drive engine from the first rotating component to a fan rotor of the fan assembly.

In another embodiment, the speed reduction assembly defines a range of gear ratios of approximately −1.5:1 to approximately −3:1.

In yet another embodiment, the speed reduction assembly defines a range of gear ratios of approximately −1.8:1 to approximately −2.8:1.

In various embodiments, the turbine section further includes a third rotating component disposed upstream of the connecting member of the first rotating component. The third rotating component defines a plurality of third airfoils extended outward along the radial direction. In one embodiment, the third rotating component is interdigitated with the first rotating component along the longitudinal direction. In another embodiment, the third rotating component defines a high speed turbine rotor or an intermediate speed turbine rotor. The third rotating component rotates at a third speed greater than a first speed of the first rotating component and a second speed of the second rotating component.

In still various embodiments, the first rotating component and the second rotating component together define a low speed turbine rotor coupled to a fan rotor, a low pressure compressor, or both.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
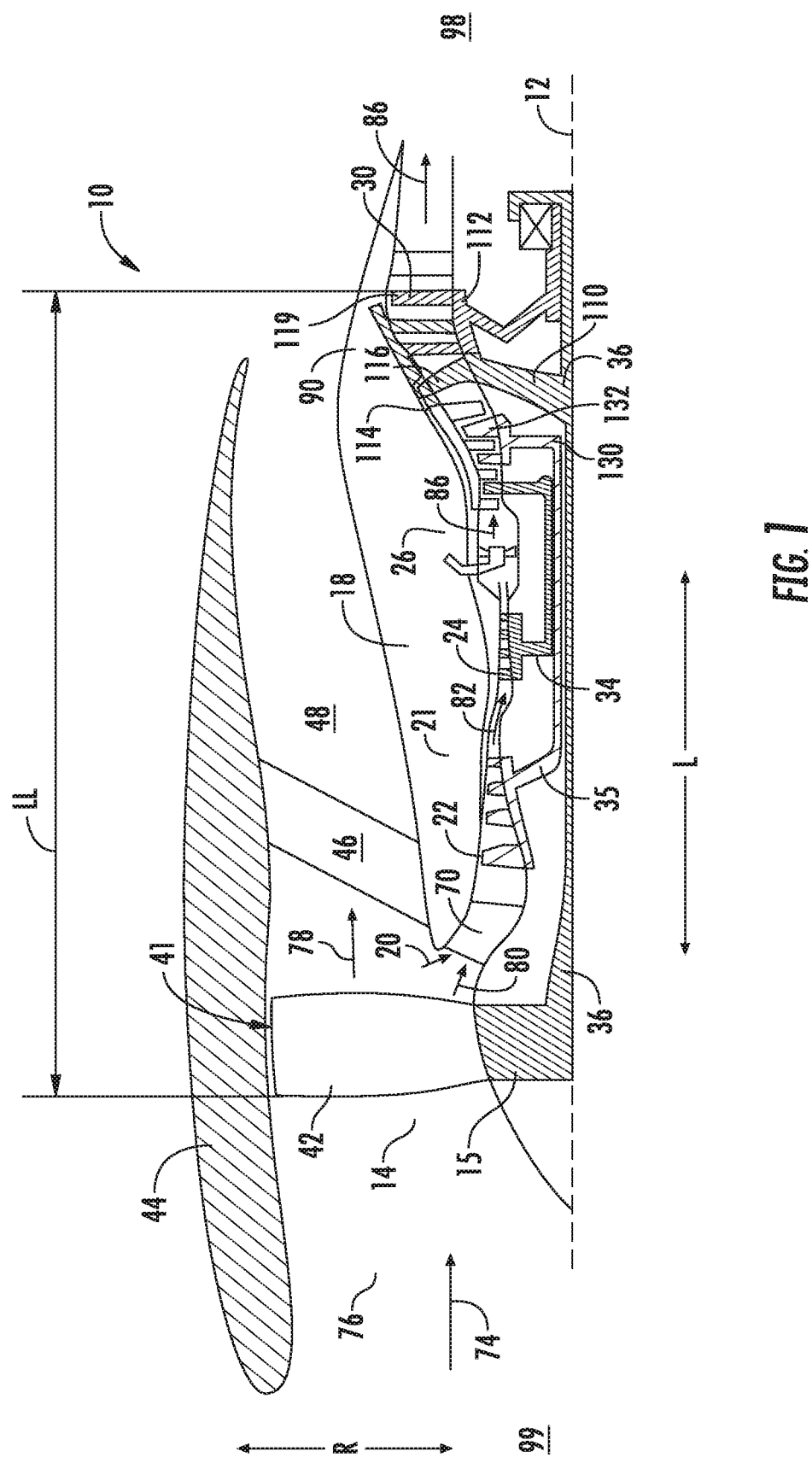
FIG. 1 is a schematic cross sectional view of an exemplary gas turbine engine incorporating an exemplary embodiment of a turbine section and speed reduction assembly according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Unless otherwise stated, "downstream" and "upstream" refer to the general direction of fluid flow of air or resulting combustion gases through a core flowpath of the engine from entry in the compressor section through exit from a turbine section.

The terms "sea level", "sea level thrust output", "thrust output", or "thrust" are used as generally known in the art in reference to thrust output of a gas turbine engine based on standards and conditions generally known in the art, such as, but not limited to, the International Standard Atmosphere (ISA) or equivalent. Thus, the aforementioned terms and their variations may include specific standard pressure, temperature, density, viscosity, altitude, elevation, and/or other parameters used when defining or comparing thrust output of a gas turbine engine. However, "sea level" is not to be construed or imply limitation to a specific pressure, temperature, density, viscosity, altitude, elevation or other parameter and is used insofar as to provide comparison within the art. As such, limitations based at least in part on the aforementioned terms and their variations may be understood as at ISA as defined by the International Organization for Standardization (ISO), but may be translated, as necessary, to equivalents based at least in part on other standards, methods, or calculations.

Unless otherwise specified, the term "maximum", or forms thereof as used herein, refers to the greatest quantity or value attainable. For example, references to "maximum thrust" refer to the greatest quantity or value of thrust output achievable for any period of time during operation of the engine. Additionally, the term "maximum" as used herein does not exclude approximation, estimation, or rounding above or greater than a specified maximum quantity.

A counter rotating turbine with reversing speed reduction assembly is generally provided. The counter rotating turbine with reversing speed reduction assembly incorporates a speed reduction assembly to a gas turbine engine while reducing or eliminating adverse effects of speed reduction assembly placement, such as increased turbine engine packaging, such as diameter or axial length, or both, and/or reducing or eliminating single-point system failure of low pressure turbine power to the fan assembly.

The counter rotating turbine engine with reversing speed reduction assembly generally includes a turbine section, including a first rotating component interdigitated with a second rotating component along a longitudinal direction, a speed reduction assembly proximate to the turbine section (i.e. within the turbine section or downstream of the turbine section) and connected at an input component to an input shaft connected to the second rotating component, and a driveshaft connected to the first rotating component and to an output component of the speed reduction assembly. The first rotating component includes an outer shroud defining a plurality of outer shroud airfoils extended inward of the outer shroud along the radial direction. The first rotating component further includes one or more connecting members coupling the outer shroud to a radially extended rotor. The second rotating component includes an inner shroud defining a plurality of inner shroud airfoils extended outward of the inner shroud along the radial direction.

In various embodiments, the first rotating component and the second rotating component of the turbine section together define a low pressure turbine rotor. The counter rotating turbine engine with reversing speed reduction assembly generally defines a torque path from the first rotating component to the driveshaft to a fan rotor of a fan assembly, and from the second rotating component to the input shaft to the speed reduction assembly, and from the speed reduction assembly to the driveshaft to the fan rotor. Therefore, the torque path defines from the low pressure turbine rotor a substantially parallel torque path from the low pressure turbine to the fan assembly. In various embodiments, the low pressure turbine rotor may distribute approximately 50% torque from the low pressure turbine rotor, via the second rotating component, to the fan assembly through the speed reduction assembly, while the remainder is distributed from the low pressure turbine rotor, via the first rotating component, to the fan assembly directly through the driveshaft to which the fan assembly is coupled.

The counter rotating turbine with reversing speed reduction assembly may generally provide to the engine benefits of a speed reduction assembly, such as reduced fan rotor rotational speed, increased bypass ratio, reduced fan pressure ratio, decreased fan assembly noise, decreased fuel consumption, and/or increased engine efficiency, while further reducing or mitigating deleterious effects of reduction gear assemblies, such as increased speed reduction assembly diameter and/or weight due to the magnitude of torque or power routed through the speed reduction assembly.

Additionally, the counter rotating turbine with reversing speed reduction assembly may further increase engine efficiency and performance by providing a turbine and speed reduction assembly arrangement that permits a three-spool engine configuration in substantially the same axial length of a comparable two-spool geared configuration. Therefore, the counter rotating turbine with reversing speed reduction assembly may further increase engine efficiency and performance by operating a low pressure turbine rotor at a more desirable operating speed, by operating a fan assembly at a more desirable operating speed, and operating a booster or intermediate pressure compressor at a speed substantially independent of the low pressure turbine rotor, such as non-proportionate of the low pressure turbine rotor.

The interdigitated turbine section of the counter rotating turbine engine may increase fuel efficiency, operational efficiency, and/or power output while reducing weight, part count, and/or packaging (e.g. radial and/or axial dimensions). For example, the interdigitated turbine section may enable a fan assembly to operate at an increased bypass ratio and/or enable the gas turbine engine to operate at an increased overall pressure ratio, thereby increasing fuel efficiency, operational efficiency, and/or power output relative to other engines of similar power output and/or packaging. The interdigitated turbine section may further reduce stationary and/or rotating airfoil quantities, and thereby engine packaging and/or weight, while maintaining or improving efficiencies, performance, or power output. Still further, the interdigitated turbine section may reduce a product of axial flow area and the square of the rotational speed (the product referred to as "$AN^2$") relative to an engine incorporating a speed reduction assembly, while additionally reducing an average work factor per stage of the turbine section.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, and an upstream end 99 and a downstream end 98 along the longitudinal direction L.

In general, the engine 10 may include a substantially tubular outer casing 18 that defines an annular inlet 20. The outer casing 18 encases or at least partially flows, in serial flow arrangement, a compressor section 21, a combustion section 26, and an interdigitated turbine section 90 (herein referred to as "turbine section 90"). In the embodiment shown in FIG. 1, the compressor section 21 defines a high pressure compressor (HPC) 24 and an intermediate pressure compressor (IPC) 22 in serial arrangement.

A fan assembly 14 is disposed forward or upstream 99 of the compressor section 21. The fan assembly 14 includes a fan rotor 15. The fan rotor 15 includes one or more fan stages 41, in which each fan stage 41 defines a plurality of blades 42 that are coupled to and extend outwardly from the fan rotor 15 in the radial direction R. In one embodiment as shown in FIG. 1, the fan rotor 15 defines a single fan stage or single circumferentially adjacent arrangement of the plurality of blades 42. In various other embodiments, the fan assembly 14 may further define a plurality of the stages 41, such as including a low pressure compressor (LPC). The fan rotor 15, and in various embodiments further defining the LPC, are together rotatable about the axial centerline 12. An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

During operation of the engine 10, as shown in FIGS. 1-4 collectively, a volume of air as indicated schematically by arrows 74 enters the engine 10 through an associated inlet 76 of the nacelle and/or fan assembly 14. As the air 74 passes across the blades 42 of the fan assembly 14, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14.

Figure 2:
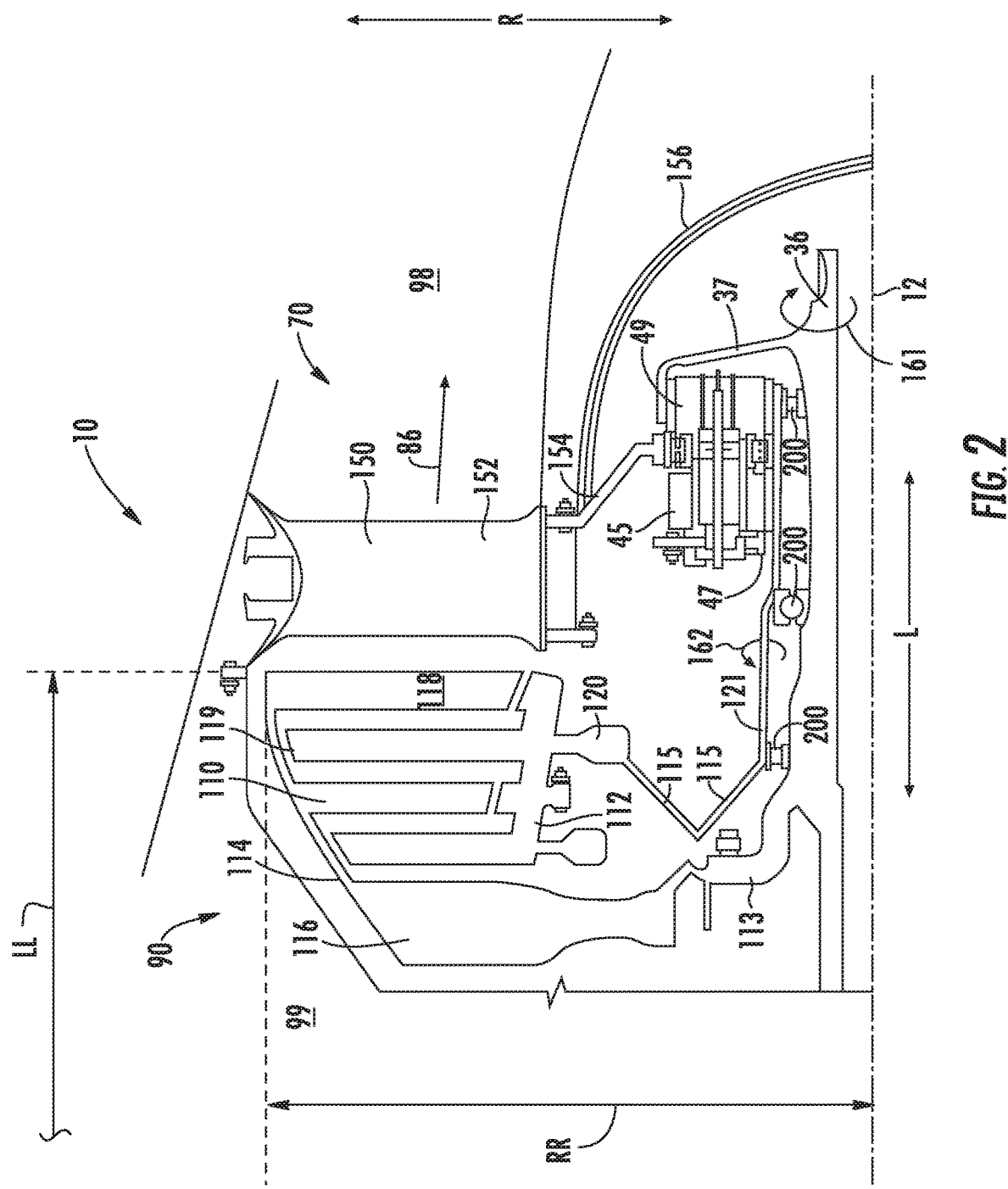
FIG. 2 is a schematic cross sectional view of an embodiment of the turbine section and speed reduction assembly shown in FIG. 1.

Referring now to FIG. 2, an exemplary embodiment of the turbine section 90 of the engine 10 is generally provided. The turbine section 90 includes a first rotating component 110 interdigitated with a second rotating component 120 along the longitudinal direction L. The first rotating component 110 includes an outer shroud 114 defining a plurality of outer shroud airfoils 118 extended inward of the outer shroud 114 along the radial direction R. The first rotating component 110 further includes one or more connecting members 116 coupling the outer shroud 114 to a generally radially extended first rotor 113. The connecting member 116 may define an airfoil including a leading edge, a trailing edge, a pressure side, and a suction side. The connecting member 116 may further define a blade (e.g., rotating around the axial centerline 12). The second rotating component 120 includes an inner shroud 112 defining a plurality of inner shroud airfoils 119 extended outward of the inner shroud 112 along the radial direction R. In various embodiments, the second rotating component 120 further includes a generally radially extended second rotor 115 to which the inner shroud 112 attaches. The radially extended rotor 115 of the second rotating component 120 may further attach to an input shaft 121 extended generally along the longitudinal direction L. In various embodiments, the inner shroud 112 and/or the outer shroud 114 are formed or defined by a plurality of hubs, disks, or drums defining an axial or longitudinal flowpath, such as a portion of a core flowpath 70 of compressed air 82 and combustion gases 86 through the engine 10 from the upstream end 99 to the downstream end 98.

In one embodiment as shown in FIG. 2, the second rotating component 120 is disposed aft or downstream 98 of the connecting member 116 of the first rotating component 110. The outer shroud 114 of the first rotating component 110 extends aft or downstream 98 of the connecting member 116. The plurality of outer shroud airfoils 118 extend inward along the radial direction R and interdigitates among the plurality of inner shroud airfoils 119 extended outward along the radial direction R from the inner shroud 112.

In the embodiment shown in FIG. 2, the turbine section 90 defines, in serial flow arrangement along the longitudinal direction from upstream 99 to downstream 98, the connecting member 116 of the first rotating component 110, the second rotating component 120, and the first rotating component 110. In various embodiments, the first and second rotating components 110, 120 may continue in interdigitation from first rotating component 110 to second rotating component 120. For example, in one embodiment, the first and second rotating components 110, 120 may together define at least three stages of rotating airfoils (e.g. connecting member 116, second rotating component 120, and outer shroud airfoil 118 of first rotating component 110). In another embodiment, the first and second rotating components 110, 120 together define between three and ten stages or rows of rotating airfoils.

The engine 10 further includes a speed reduction assembly 45 proximate to the turbine section 90. The speed reduction assembly 45 includes an input component 47 and an output component 49. The input shaft 121 is connected to the input component 47 and provides power into the speed reduction assembly 45. The second rotating component 120 is coupled to the input shaft 121 and provides power into the speed reduction assembly 45. In one embodiment, the speed reduction assembly 45 is disposed within the turbine section 90 along the radial direction R. In another embodiment, the speed reduction assembly 45 is disposed toward the downstream end 98 of the engine 10. For example, the speed reduction assembly 45 may be disposed toward the downstream end 98 of the turbine section 90. As another example, the speed reduction assembly 45 is disposed downstream of the turbine section 90 within an exhaust frame 150.

Referring to FIGS. 1 and 2, the engine 10 further includes a driveshaft 36 extended in the longitudinal direction L. The driveshaft 36 is connected to the output component 49 of the speed reduction assembly 45. The rotor 113 of the first rotating component 110 is coupled to the driveshaft 36. As shown in FIG. 2, the speed reduction assembly 45 is coupled to the driveshaft 36 at the downstream end 98. The first rotating component 110 is coupled to the driveshaft 36 between the upstream end 99 and the downstream end 98 of the driveshaft 36.

In one embodiment, the driveshaft 36 defines a coupling 37 attached to the speed reduction assembly 45 at the downstream end 98 of the engine 10. The coupling 37 may be defined as extended substantially in the radial direction R from the axially extended portion of the driveshaft 36. In various embodiments, the coupling 37 may define springing properties to absorb intermittent changes in power or torque from the speed reduction assembly 45 to the fan assembly 14, or from the fan assembly 14 to the speed reduction assembly 45, such as a flexible coupling. In one embodiment, the coupling 37 further defines a shear-able material relative to the axially extended portion of the driveshaft 36 and/or the speed reduction assembly 45. For example, the coupling 37 may define a portion of the driveshaft 36 designed to break, shear, or otherwise liberate the driveshaft 36 from the speed reduction assembly 45 at or above a critical load. The critical load may correspond to the load exerted by the fan assembly 14 onto the driveshaft 36 following a failure event (e.g. foreign object debris strike, fan blade-out, fan rotor failure, etc.). Alternatively, or additionally, the critical load may correspond to the load exerted by the speed reduction assembly 45 onto the driveshaft 36 following failure of speed reduction assembly 45 rotation. For example, the critical load may correspond to the load exerted from the first rotating component 110 to the driveshaft 36 when the speed reduction assembly 45 and/or second rotating component 120 fail to rotate. In various embodiments, failure of the second rotating component 120 and/or speed reduction assembly 45 to rotate may result in liberation of the driveshaft 36 from the speed reduction assembly 45 at the coupling 37, thereby enabling rotation of the fan assembly 14 via the first rotating component 110 alone.

The engine 10 shown and described in regard to FIGS. 1 and 2 may define a torque path from first rotating component 110 to the driveshaft 36, and from the driveshaft 36 to the fan rotor 15 of the fan assembly 14. Still further, the engine 10 may define the torque path from the second rotating component 120 to the input shaft 121, and from the input shaft 121 to the speed reduction assembly 45, and from the speed reduction assembly 45 to the driveshaft 36 to the fan rotor 15.

In various embodiments, the first rotating component 110 rotates in a first direction 161 and the second rotating component 120 rotates in a second direction 162 opposite of the first direction 161. The first rotating component 110, and the output component 49 of the speed reduction assembly 45 to which the first rotating component 110 via the driveshaft 36, rotates in the first direction 161 as the second rotating component 120, coupled to the input component 47 of the speed reduction assembly 45 via the input shaft 121, rotates in the second direction 162. As such, in the embodiment shown in FIG. 2, the speed reduction assembly 45 is configured as a reversing speed reduction assembly.

In various embodiments, the speed reduction assembly 45 defines a plurality of gears in which the input component 47 and/or the input shaft 121 to which the input component 47 attaches rotates at a speed greater than the output component 49 or the driveshaft 36 receiving power from the speed reduction assembly 45. As such, the second rotating component 120 rotates at a speed greater than the first rotating component 110. Additionally, the second rotating component 120 rotates at a speed greater than the first rotating component 110 in a direction opposite of the first rotating component 110.

In various embodiments of the engine 10, the speed reduction assembly 45 defines a range of gear ratios of about −1.5:1 to about −3:1. For example, in one embodiment the speed reduction assembly 45 defines a reversing speed reduction assembly in which the input component 47 rotates approximately 1.5 times for each rotation of the output component 49 in a direction opposite of the input component 47.

In other embodiments, the speed reduction assembly 45 defines a range of gear ratios of about −1.8:1 to about −2.8:1. For example, in one embodiment the speed reduction assembly 45 defines a reversing speed reduction assembly in which the input component 47 rotates approximately 2.8 times for each rotation of the output component 49 in a direction opposite of the input component 47.

Referring still to FIG. 2, the engine 10 may further include the exhaust frame 150 disposed aft or downstream 98 of the first and second rotating components 110, 120. The exhaust frame 150 defines one or more exhaust vanes 152 extended in the radial direction R. The exhaust frame 150 further defines a support structure 154 extended inward along the radial direction R. The support structure 154 generally defines an annular casing defining one or more fastening locations. The rear mounted speed reduction assembly 45 is statically coupled to the exhaust frame at the support structure 154.

In various embodiments, the exhaust frame 150 further includes a cap 156 covering or concealing the speed reduction assembly 45 within the exhaust frame 150 from external view and environmental conditions. The cap 156 may be removed to provide relatively quick access to the speed reduction assembly 45, the driveshaft 36, or other components of the engine 10 with rear mounted speed reduction assembly 45, in proximity to an unobstructed aft, outside portion of the engine 10, in contrast to a forward mounted speed reduction assembly configuration (e.g. within a fan assembly or LPC), in which the fan assembly is generally removed to access the speed reduction assembly.

Referring back to FIGS. 1 and 2, in various embodiments, the first and second rotating component 110, 120 together define a low pressure turbine (LPT) rotor. In such embodiments, the driveshaft 36 defines a low pressure (LP) shaft connected and rotatable with the fan rotor 15 of the fan assembly 14. The fan assembly 14 is driven collectively by the first rotating component 110 and the second rotating component 120. By arranging the engine 10 such that the first rotating component 110 is coupled directly to the driveshaft 36 that is coupled to the fan rotor 15, and by arranging the second rotating component 120 as coupled to the speed reduction assembly 45 that is coupled at the output component 49 to the driveshaft 36, in one embodiment the first rotating component 110 transmits approximately 25% to about 75% of power or torque for rotation of the fan assembly 14. In another embodiment, the second rotating component 120 transmits approximately 30% to about 60% of power or torque for rotation of the fan assembly 14, in which the second rotating component 120 transmits power or torque through the speed reduction assembly 45 to the driveshaft 36 to the fan assembly 14. Additionally, interdigitating the first and second rotating components 110, 120 to define the LPT rotor results in efficiency and performance benefits due to relatively low flowpath velocities, reduced airfoil count (i.e. removed stationary vanes between rotating components), and/or reduced longitudinal dimensions of the LPT rotor relative to forward mounted speed reduction assembly gas turbine engines (e.g. speed reduction assembly mounted at or within a fan assembly).

Figure 3:
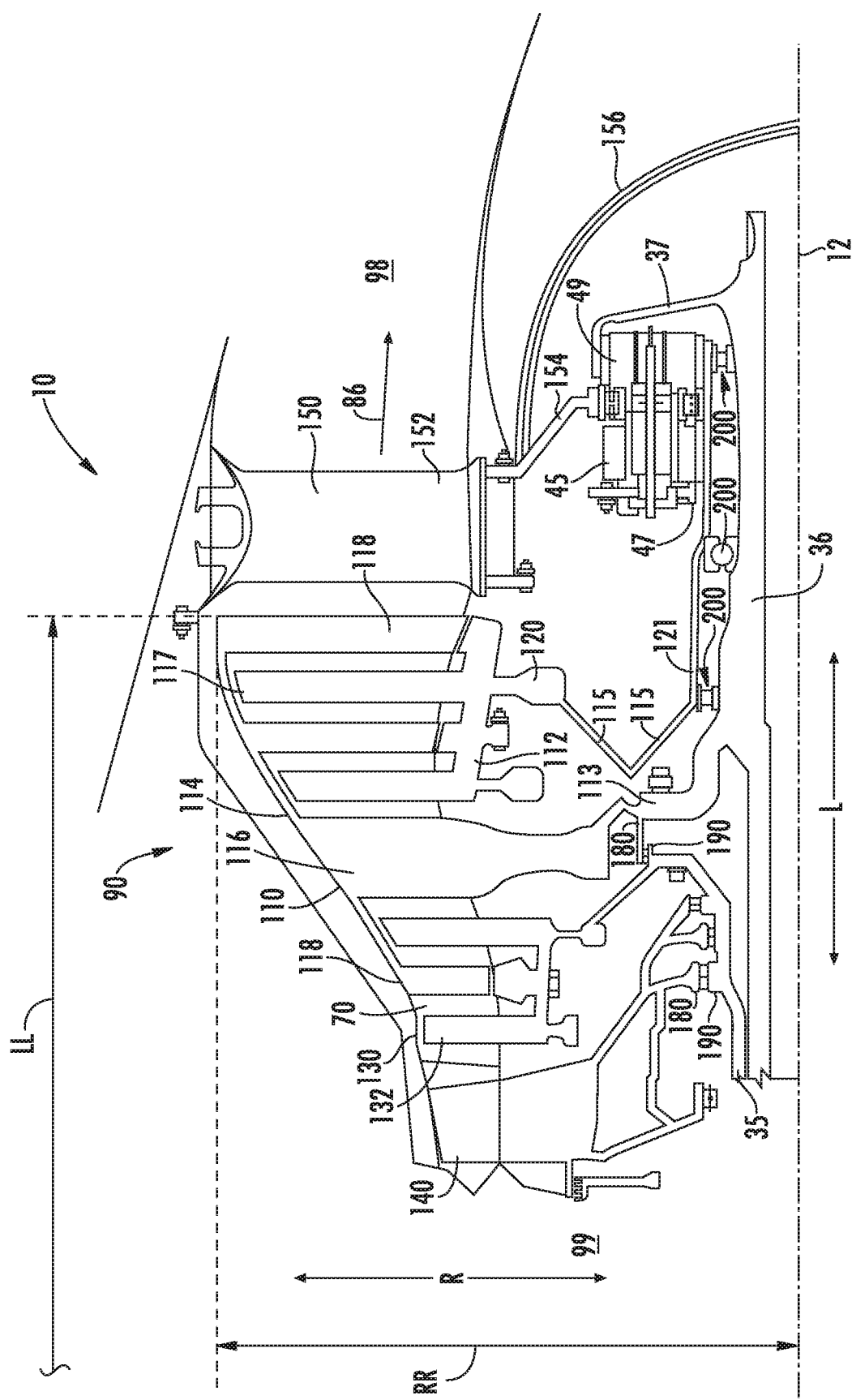
FIG. 3 is a schematic cross sectional view of another embodiment of the turbine section and speed reduction assembly shown in FIG. 1.
Figure 4:
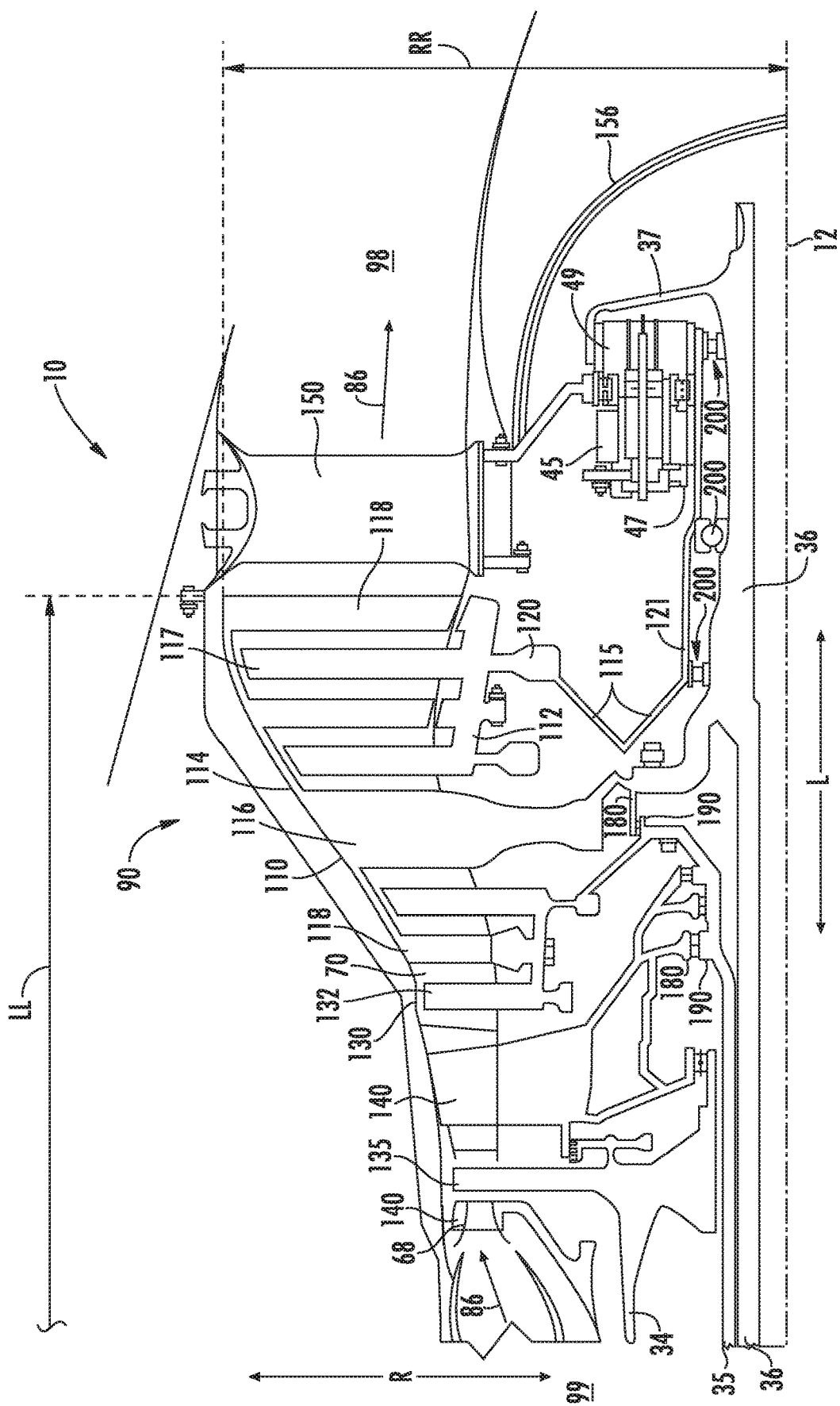
FIG. 4 is a schematic cross sectional view of yet another embodiment of the turbine section and speed reduction assembly shown in FIG. 1.

Referring now to FIGS. 2-4, in one embodiment, the engine 10 including the turbine section 90 defining the first rotating component 110 and the second rotating component 120 and the speed reduction assembly 45 defines a maximum radius RR (shown in FIGS. 2-4) of the turbine section at an outer diameter of one or more rotors. For example, in the embodiment shown in FIG. 2, the maximum radius RR is defined from the axial centerline 12 to an outer diameter of the outer shroud 114 of the first rotating component 110 surrounding the plurality of inner shroud airfoils 119 of the second turbine component 120. In other embodiments not shown, the maximum radius RR is defined from the axial centerline 12 to an outer diameter of the plurality of inner shroud airfoils 119, in which at least one stage of the plurality of inner shroud airfoils 119 of the second rotating component 120 defines a radius greater than the outer shroud 114 of the first rotating component 110.

In one embodiment, the engine 10 defines the maximum radius RR approximately between 15 inches and approximately 20 inches for a gas turbine engine defining a maximum thrust output TT between approximately 21000 and approximately 32000 pounds of thrust.

In still various embodiments, the engine 10 including the various embodiments of the turbine section 90 generally provided herein defines a radius per unit thrust. The radius per unit thrust is defined as Radius per Unit Thrust=Maximum Radius $RR$/MaximumThrust Output $TT$ In one embodiment, the engine 10 including the various embodiments of the turbine section 90 generally provided in FIGS. 1-4 defines the radius per unit thrust between approximately 0.0004 to approximately 0.0010 inches per pound of thrust.

Referring now to FIG. 1, in another embodiment, the engine 10 including various embodiments of the turbine section 90 described herein defines a maximum length LL. The maximum length LL is defined from an upstream-most point of the engine 10 (e.g., most proximate to the upstream end 99) to a downstream-most point of the engine 10 (e.g., most proximate to the downstream end 98). In various embodiments, the maximum length LL is defined from an upstream-most end to a downstream-most end of a turbomachinery of the engine 10, in which the turbomachinery is defined as the fan section 14, the compressor section 21, the combustor section 26, and the turbine section 90. For example, the upstream-most end of the turbomachinery of the engine 10 may be defined from the upstream-most point of the outer radius of the blades 42 of the fan assembly 14 to a downstream-most end of a last stage rotor of the turbine section 90.

In one embodiment, the engine 10 defines a maximum length LL approximately between 91 inches and approximately 113 inches for the engine 10 defining a maximum thrust output between approximately 21000 and approximately 32000 pounds of thrust.

Referring now to FIGS. 1-4, in yet various embodiments, the engine 10 including various embodiments of the turbine section 90 described herein defines a ratio of the maximum length LL of the engine 10 to the maximum radius RR of approximately 5.65. In another embodiment, the engine 10 defines a ratio of the maximum length LL to the maximum radius RR of approximately 6.07.

In still other embodiments, the engine 10 may define a ratio of maximum length LL to the maximum radius RR of approximately 7.53. In still another embodiment, the engine 10 defines a ratio of maximum length LL to maximum radius RR of approximately 4.55.

In still yet another embodiment, the engine 10 defines a maximum thrust between approximately 21000 and approximately 32000 pounds thrust. The first rotating component 110 and the second rotating component 120 together define between approximately 261 and approximately 392 rotating airfoils. In one embodiment, the engine 10 defines a ratio of rotating airfoils of the first rotating component 110 and second rotating component 120 together versus the maximum thrust output, in which the ratio ranges between approximately 0.0081 to approximately 0.0187 airfoils per pound of thrust.

In still various embodiments, the engine 10 defines between approximately 3 and 10 stages of rotating airfoils within the turbine section 90. In one embodiment, the engine 10 and turbine section 90 defines a ratio of rotating airfoils per each stage of the first rotating component 110 and the second rotating component 120 together, in which the ratio ranges between approximately 0.0011 and approximately 0.0031 airfoils per pound of thrust.

In another embodiment, the engine 10 defines a ratio of the maximum length LL to the quantity of rotating airfoils per stage of the first rotating component 110 and the second component 120 together. In one embodiment, the engine 10 defines the ratio between approximately 0.232 to approximately 0.435 inches per airfoil.

For example, the speed reduction assembly 45 generally provided herein enables a reduced radius of the turbine section 90, decreased airfoil quantity (e.g., fewer stages of rotating airfoils 116, 118, 119, reduction or elimination of stationary airfoils, etc.), and fewer overall longitudinally spaced stages of airfoils within the turbine section 90, such as to decrease the maximum length LL of the engine 10.

In various embodiments described herein, the engine 10 may define a direct drive from the driveshaft 36 to the fan assembly 14. For example, the turbine section 90 as described herein may obviate or remove a coupling shaft between a reduction gearbox and a fan assembly. The engine 10 may further mitigate or eliminate issues related to bowed rotor, increased cooling times between shutdown and startup, increased motor-to-cool times, and delayed startups following shutdown. Furthermore, the embodiments of the engine 10 described herein may provide one or more of the aforementioned benefits of a direct drive configuration and further provide the airfoil quantities, lengths, radii, and thrust outputs as generally provided herein.

Still further, the various embodiments of the engine 10 and the turbine section 90 generally provided reduce engine packaging (e.g., maximum length LL, maximum radius RR, or both) versus a thrust output relative to known indirect drive speed reduction gas turbine engines or direct drive gas turbine engines. Additionally, the counter rotating speed reduction assembly 45 generally provided herein enables an equivalent or greater amount of work to be performed with half or fewer airfoils relative to known direct drive gas turbine engines.

Referring still to FIG. 3, the turbine section 90 further includes a third rotating component 130 disposed forward or upstream 99 of the one or more connecting members 116 of the first rotating component 110. The third rotating component 130 includes a plurality of third airfoils 132 extended outward along the radial direction R. In one embodiment, the third rotating component 130 is disposed forward or upstream 99 of the first and second rotating component 110, 120. In various embodiments, the third rotating component 130 is disposed forward or upstream 99 along the longitudinal direction L of the connecting members 116 of the first rotating component 110.

Referring now to the exemplary embodiments of the turbine section 90 shown in FIGS. 3 and 4, the outer shroud 114 of the first rotating component 110 further extends forward or upstream 99 of the connecting member 116 along the longitudinal direction L. The outer shroud 114 further includes the plurality of outer shroud airfoils 118 extended inward along the radial direction R and interdigitated among the third rotating component 130, such as the plurality of third rotating airfoils 132 extended outward along the radial direction R from the third rotating component 130.

Referring to the embodiment shown in FIG. 3, the turbine section 90 may define the third rotating component 130 as a single stage in which the outer shroud 114 of the first rotating component 110 extends forward or upstream 99 of the third rotating component 130. In such an embodiment, the turbine section 90 defines, in serial flow arrangement along the longitudinal direction L from upstream 99 to downstream 98, a first stage defining the first rotating component 110, a second stages defining the third rotating component 130, and a third stage defining the connecting member 116 of the first rotating component 110. In various embodiments, the third rotating component 130 may define a high speed turbine rotor or an intermediate speed turbine rotor. The third rotating component 130 rotates at a third speed greater than a first speed of the first rotating component 110 and a second speed of the second rotating component 120.

Referring to FIG. 3, the third rotating component 130 may define the HPT rotor of an HPT assembly, in which the third rotating component 130 as the HPT rotor is drivingly connected and rotatable with a high pressure (HP) shaft 34. The HP shaft 34 is connected to the HPC 24, of which is driven in rotation by the third rotating component 130 of the turbine section 90.

In another embodiment, the third rotating component 130 may define the IPT rotor of an IPT assembly, in which the third rotating component 130, as the IPT rotor, is drivingly connected and rotatable with an intermediate pressure (IP) shaft 35. The IP shaft 35 is connected to the IPC 22, of which is driven in rotation by the third rotating component 130 of the turbine section 90.

In the embodiment shown in FIG. 4, the first rotating component 110 is interdigitated between two rotating stages of the third rotating component 130. As such, in the exemplary embodiment shown in FIG. 4, the turbine section 90 defines, in serial flow arrangement along the longitudinal direction L from upstream 99 to downstream 98, a first stage defining the third rotating component 130, a second stage defining the first rotating component 110, a third stage defining the third rotating component 130, and a fourth stage defining the connecting member 116 of the first rotating component 110.

In the embodiment shown in FIG. 4, the engine 10 and turbine section 90 may further include a fourth rotating component 135 disposed forward or upstream 99 of the first, second, and third rotating components 110, 120, 130. In various embodiments, the fourth rotating component 135 may define the HPT rotor. Furthermore, the third rotating component 130 may define the IPT rotor.

Referring still to FIG. 4, the turbine section 90 may further include a turbine vane assembly 140 disposed forward or upstream 99 of the one or more connecting members 116. The turbine vane assembly 140 may define a plurality of stationary airfoils (i.e. vanes) in circumferential arrangement. In one embodiment, the turbine vane assembly 140 is disposed forward or upstream 99 of the plurality of outer shroud airfoils 118 along the longitudinal direction L. For example, the turbine vane assembly 140 may define a first turbine vane or nozzle 68 toward the downstream end 98 of the combustion section 26. In other embodiments, the turbine vane assembly 140 is disposed between the fourth rotating component 135 and other rotating components, such as the first, second, or third rotating components 110, 120, 130. In still other embodiments, the turbine vane assembly 140 may be defined between the third rotating component 130 along the longitudinal direction L. For example, in lieu of the first rotating component 110 extended forward or upstream from the connecting member 116, the turbine vane assembly 140 may be disposed between the two third rotating component 130 stages.

Referring to FIGS. 2-4, in various embodiments the third rotating component 130 may rotate in a direction opposite of the first rotating component 110 (i.e. counter rotating). For example, the first rotating component 110 may be configured to rotate in the first direction 161, and the second and third rotating components 120, 130 may be configured to rotate in the second direction 162 opposite of the first direction 161. In various embodiments, the fourth rotating component 135 may be configured to rotated in either the first direction 161 or in the second direction 162, either in co-rotation or in counter-rotation with the first rotating component 110.

The engine 10 and turbine section 90 shown and described herein may improve upon existing turbine sections by providing improved fuel efficiency, operational efficiency, and/or power output while maintaining or reducing weight, part count, and/or packaging. The plurality of outer shroud airfoils 118 of the first rotating component 110 interdigitated among the second and/or third rotating components 120, 130 may reduce packaging and reduce part count by removing stages of stationary airfoils between each rotating component. Additionally, the turbine section 90 may provide efficiency benefits comparable to a speed reduction assembly without adding weight or size (e.g. axial length) to the engine 10. Furthermore, the turbine section 90 may improve engine 10 efficiency by reducing requirements for cooling air, generally extracted from the compressor section 21 and often considered to remove potential propulsive energy from the engine 10.

Referring now to the embodiments shown and described in regard to FIGS. 1-4, each stage of the turbine section 90 may be constructed as individual blades installed into drums or hubs, or integrally bladed rotors (IBRs) or bladed disks, or combinations thereof. The blades, hubs, or bladed disks may be formed of ceramic matrix composite (CMC) materials and/or metals appropriate for gas turbine engine hot sections, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. For example, in one embodiment, at least a portion of the plurality of outer shroud airfoils 118 define a ceramic or CMC material.

The turbine section 90, or portions or combinations of portions thereof, including the inner shroud 112, the outer shroud 114, the connecting member(s) 116, the plurality of outer shroud airfoils 118, and/or the plurality of inner shroud airfoils 119, may be formed using additive manufacturing or 3D printing, or casting, forging, machining, or castings formed of 3D printed molds, or combinations thereof. The turbine section 90, or portions thereof, such as stages of the rotors 110, 120, 130, 135 the outer shroud 114, the inner shroud 112, and other portions may be mechanically joined using fasteners, such as nuts, bolts, screws, pins, or rivets, or using joining methods, such as welding, bonding, friction or diffusion bonding, etc., or combinations of fasteners and/or joining methods.

The systems and methods shown in FIGS. 1-4 and described herein may decrease fuel consumption, increase operability, increase engine performance and/or power output while maintaining or reducing weight, part count, and/or packaging (e.g. radial and/or axial dimensions). The systems and methods provided herein may allow for increased high bypass ratios and/or overall pressure ratios over existing gas turbine engine configurations, such as turbofans, while maintaining or reducing packaging relative to other gas turbine engines of similar power output. The systems and methods described herein may improve bypass ratio and/or overall pressure ratio and thereby increase overall gas turbine engine efficiency. The systems provided herein may increase overall gas turbine engine efficiency by reducing or eliminating stationary airfoils that require cooling air (e.g. HPT or IPT vanes). Additionally, the systems provided herein may reduce gas turbine engine packaging and weight, thus increasing efficiency, by reducing rotating and/or stationary airfoil quantities (e.g. blades and/or vanes) by approximately 40% or more over gas turbine engines of similar power output.

The counter rotating turbine engine 10 with reversing speed reduction assembly 45 generally defines a torque path from the first rotating component 110 to the driveshaft 36 to the fan rotor 15 of the fan assembly 14, and from the second rotating component 120 to the input shaft 121 to the speed reduction assembly 45, and from the speed reduction assembly 45 to the driveshaft 36 to the fan rotor 15. In various embodiments, the torque path is defined from the first rotating component 110 to the driveshaft 36 via the rotor 113 extended generally along the radial direction R. In still various embodiments, the torque path is defined from the second rotating component 120 to the input shaft 121 via the rotor 115 extended generally along the radial direction R. Therefore, the torque path defines from the low pressure turbine rotor a substantially parallel torque path from the low pressure turbine (collectively, the first and second rotating components 110, 120) to the fan assembly 14. In various embodiments, the low pressure turbine rotor may distribute approximately 50% torque from the low pressure turbine rotor, via the second rotating component 120, to the fan assembly 14 through the speed reduction assembly 45, while the remainder is distributed from the low pressure turbine rotor, via the first rotating component 110, to the fan assembly 14 directly through the driveshaft 36 to which the fan assembly 14 is coupled.

The engine 10 described and shown herein, in which approximately 50% power or torque transmits through the speed reduction assembly 45, may therefore define the speed reduction assembly 45 as smaller in contrast to known integral drive turbofan configurations in which substantially 100% of the LPT rotor power and torque is transmitted in series from the LPT rotor to the fan assembly, including one or more stages of fan or LPC rotors. Still further, as the speed reduction assembly 45 transmits less power or torque versus geared engine or speed reduction configurations of similar thrust output and/or size, bypass ratio, overall pressure ratio, or fan pressure ratio, the speed reduction assembly 45 is subject to less wear and stress, and may therefore reduce failure risks associated with geared turbofan configurations. Still furthermore, as the speed reduction assembly 45 transmits less power or torque, the reduction in speed reduction assembly 45 dimensions enables benefits of a geared engine configuration without increases in engine diameter.

Additionally, as the engine 10 defines an at least parallel torque path from the first rotating component 110 and the second rotating component 120 to the fan assembly 14, speed reduction assembly 45 failure modes are mitigated over known geared engine configurations. For example, events resulting in loss of speed reduction assembly 45 operation, such as, but not limited to, loss of oil flow or pressure to the speed reduction assembly 45, may result in the speed reduction assembly 45 and second rotating component 120 losing rotation (i.e. become static), thereby shearing or otherwise liberating the driveshaft 36 from the speed reduction assembly 45 and enabling at least a portion of power or torque to transmit to the fan assembly 14 from the first rotating component 110.

The counter rotating turbine with reversing speed reduction assembly may generally provide to the engine benefits of a speed reduction assembly, such as reduced fan rotor rotational speed, increased bypass ratio, reduced fan pressure ratio, decreased fan assembly noise, decreased fuel consumption, and/or increased engine efficiency, while further reducing or mitigating deleterious effects of reduction gear assemblies, such as increased speed reduction assembly diameter and/or weight due to the magnitude of torque or power routed through the speed reduction assembly.

Additionally, the counter rotating turbine with reversing speed reduction assembly may further increase engine efficiency and performance by providing a turbine and speed reduction assembly arrangement that permits a three-spool engine configuration in substantially the same axial length of a comparable two-spool geared configuration. Therefore, the counter rotating turbine with reversing speed reduction assembly may further increase engine efficiency and performance by operating a low pressure turbine rotor at a more desirable operating speed, by operating a fan assembly at a more desirable operating speed, and operating a booster or intermediate pressure compressor at a speed substantially independent of the low pressure turbine rotor, such as non-proportionate of the low pressure turbine rotor.

Still further, the systems shown in FIGS. 1-4 and described herein may reduce a product of a flow area and the square of the rotational speed (the product herein referred to as "$AN^2$") of the gas turbine engine relative to a gas turbine engine incorporating a forward mounted speed reduction assembly (e.g. near or within the fan assembly). Generally, lowering the $AN^2$, such as by reducing the rotational speed and/or the flow area, increases the required average stage work factor (i.e. the average required loading on each stage of rotating airfoils). However, the systems and methods described herein may lower the $AN^2$ while also lowering the average stage work factor and maintaining axial length of the turbine section 90 (compared to engines of similar thrust output and packaging) by interdigitating the first rotating component 110 among the one or more stages of the second rotating component 120. Therefore, the first rotating component 110 may increase the quantity of rotating stages of airfoils while reducing the average stage work factor, and therefore the $AN^2$, while mitigating increases in axial length to produce a similar $AN^2$ value. The first rotating component 110 may further reduce the $AN^2$ while additionally reducing the overall quantity of airfoils, rotating and stationary, in the turbine section 90 relative to turbine sections of gas turbine engines of similar power output and/or packaging.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, comprising:
a turbine section comprising a first rotating component interdigitated along a longitudinal direction with a second rotating component, wherein the first rotating component and the second rotating component are each coupled to a speed reduction assembly in counter-rotating arrangement, wherein the speed reduction assembly comprises an input component and an output component;
the first rotating component comprising an outer shroud and a plurality of outer shroud airfoils extended inward along a radial direction from the outer shroud, and wherein a connecting member couples the outer shroud to a radially extended first rotor, the first rotating component rotatable in a first direction at a first speed;

the second rotating component comprising an inner shroud and a plurality of inner shroud airfoils extended outward along the radial direction from the inner shroud, the plurality of inner shroud airfoils in alternating arrangement along the longitudinal direction with the plurality of outer shroud airfoils, and wherein the second rotating component is connected to the input component to provide power into the speed reduction assembly, the second rotating component rotatable in a second direction opposite of the first direction at a second speed greater than the first speed;

a third rotating component positioned upstream of the connecting member of the first rotating component, the third rotating component interdigitated with the first rotating component;

a fan assembly; and a driveshaft coupled to the fan assembly, the output component of the speed reduction assembly, and the first rotating component, wherein the first rotating component and the driveshaft are together rotatable at the first speed in the first direction, the gas turbine engine defining a radius per unit thrust defined by a maximum radius at the turbine section over a maximum thrust output between 0.0004 to 0.0010 inches per pound thrust.

2. The gas turbine engine of claim 1, wherein the engine defines a maximum radius at the turbine section from an axial centerline to an outer diameter of the outer shroud of the first rotating component, the maximum radius defined between 15 inches and 20 inches.

3. The gas turbine engine of claim 1, wherein the engine defines a maximum radius at the turbine section from an axial centerline to an outer diameter of the inner shroud airfoils of the second rotating component, the maximum radius defined between 15 inches and 20 inches.

4. The gas turbine engine of claim 1, wherein the engine defines a maximum thrust output between 21000 and 32000 pounds of thrust.

5. The gas turbine engine of claim 1, wherein the engine defines a maximum length approximately between 91 inches and 113 inches.

6. The gas turbine engine of claim 5, wherein the engine defines a ratio of the maximum length to the maximum radius of between 7.53 and 4.55.

7. The gas turbine engine of claim 5, wherein the maximum length is defined from an annular inlet of the fan assembly to an exit of the last rotor stage of the turbine section.

8. The gas turbine engine of claim 1, wherein the engine defines between 261 and 392 rotating airfoils.

9. The gas turbine engine of claim 8, wherein the engine defines a ratio of rotating airfoils of the first rotating component and the second rotating component together versus a maximum thrust output, wherein the ratio ranges between 0.0081 to 0.0187 airfoils per pound thrust.

10. The gas turbine engine of claim 9, wherein the turbine section defines between 3 and 10 stages of rotating airfoils at the first rotating component and the second rotating component together.

11. The gas turbine engine of claim 9, wherein the turbine section defines a ratio of rotating airfoils per each stage of the first rotating component and the second rotating component together versus the maximum thrust output, and wherein the ratio ranges between 0.0011 and 0.0031 airfoils per pound thrust.

12. The gas turbine engine of claim 5, wherein the engine defines a ratio of the maximum length to rotating airfoils of the first rotating component and the second rotating component together, wherein the ratio ranges between 0.232 to 0.435 inches per airfoil.

13. The gas turbine engine of claim 1, wherein the engine defines a direct drive engine from the first rotating component to a fan rotor of the fan assembly.

14. The gas turbine engine of claim 1, wherein the speed reduction assembly defines a range of gear ratios of −1.5:1 to −3:1.

15. The gas turbine engine of claim 1, wherein the speed reduction assembly defines a range of gear ratios of −1.8:1 to −2.8:1.

16. The gas turbine engine of claim 1, wherein the third rotating component comprises a plurality of third airfoils extended outward along the radial direction.

17. The gas turbine engine of claim 1, wherein the third rotating component is interdigitated with the first rotating component along the longitudinal direction.

18. The gas turbine engine of claim 17, wherein the third rotating component defines a high speed turbine rotor or an intermediate speed turbine rotor, wherein the third rotating component rotates at a third speed greater than a first speed of the first rotating component and a second speed of the second rotating component.

19. The gas turbine engine of claim 1, wherein the first rotating component and the second rotating component together define a low speed turbine rotor coupled to a low pressure compressor.

20. The gas turbine engine of claim 1, comprising:
a support structure positioned aft of the first rotating component and the second rotating component, wherein the speed reduction assembly is coupled to the support structure.

* * * * *